US012749030B2

(12) United States Patent
McKay et al.

(10) Patent No.: US 12,749,030 B2
(45) Date of Patent: Sep. 29, 2026

(54) PREDICTING POWER GENERATION OF A RENEWABLE ENERGY INSTALLATION

(71) Applicant: Eaton Intelligent Power Limited, Dublin (IE)

(72) Inventors: Andrew McKay, Rathmines (IE); Andrei Marinescu, Dublin (IE)

(73) Assignee: EATON INTELLIGENT POWER LIMITED, Dublin (IE)

(*) Notice: Subject to any disclaimer, the term of this patent is extended or adjusted under 35 U.S.C. 154(b) by 413 days.

(21) Appl. No.: 18/551,784

(22) PCT Filed: Mar. 22, 2021

(86) PCT No.: PCT/EP2021/057276
§ 371 (c)(1),
(2) Date: Sep. 21, 2023

(87) PCT Pub. No.: WO2022/199789
PCT Pub. Date: Sep. 29, 2022

(65) Prior Publication Data
US 2024/0095612 A1 Mar. 21, 2024

(51) Int. Cl.
*G06Q 10/04* (2023.01)
*G06Q 50/06* (2012.01)
(Continued)

(52) U.S. Cl.
CPC ............. *G06Q 10/04* (2013.01); *G06Q 50/06* (2013.01); *H02J 3/381* (2013.01); *H02J 2101/22* (2026.01)

(58) Field of Classification Search
CPC ...... G06Q 10/04; G06Q 50/06; H02J 2300/22
See application file for complete search history.

(56) References Cited

U.S. PATENT DOCUMENTS 9,170,033 B2 * 10/2015 Kroyzer .................. F24S 50/00
2010/0198420 A1 * 8/2010 Rettger .................. H02S 10/00
706/46

(Continued)

FOREIGN PATENT DOCUMENTS

CN 107077783 A 8/2017
WO WO-2016146788 A1 * 9/2016 ............ G06Q 10/04

OTHER PUBLICATIONS

Ye Lin, et al., "Short-term wind power prediction based on spatial model", Renewable Energy, vol. 101, Feb. 1, 2017 (Feb. 1, 2017), pp. 1067-1074, XP029806236, ISSN: 0960-1481, DOI: 10.1016/J. RENENE.2016.09.069 1. Introduction, pp. 1067-1068.

(Continued)

*Primary Examiner* — Vincent H Tran
(74) *Attorney, Agent, or Firm* — LEYDIG, VOIT & MAYER, LTD.

(57) ABSTRACT

The invention provides a computer-implemented method for determining predicted power generation of a renewable energy installation. The method includes receiving current power generation data indicative of a current power generation value for each of one or more neighbouring renewable energy installations, and determining, based on the received current power generation data, a current data map indicative of current power generation values across an area including the renewable energy installation and the one or more neighbouring renewable energy installations. The method includes retrieving a previous data map indicative of power generation values across the area at a previous time, and determining, based on the previous and current data maps, a future data map indicative of power generation values across the area at a future time, determining a predicted power generation value of the renewable energy installation at the future time based on the determined future data map.

19 Claims, 3 Drawing Sheets

(51) Int. Cl.

| | |
|---|---|
| ***H02J 3/38*** | (2006.01) |
| *H02J 101/22* | (2026.01) |

(56) References Cited

U.S. PATENT DOCUMENTS

| | | | | |
|---|---|---|---|---|
| 2013/0066569 | A1* | 3/2013 | Sato | G01W 1/10 702/60 |
| 2014/0046610 | A1* | 2/2014 | Bamberger | G01R 21/133 702/60 |
| 2014/0278108 | A1* | 9/2014 | Kerrigan | G01W 1/10 702/3 |
| 2015/0177415 | A1* | 6/2015 | Bing | G01W 1/10 702/3 |
| 2015/0186904 | A1* | 7/2015 | Guha | G06Q 10/06316 705/7.26 |
| 2016/0366602 | A1* | 12/2016 | Rapp | H04L 45/22 |
| 2017/0256162 | A1 | 9/2017 | Schilling et al. | |
| 2018/0019594 | A1* | 1/2018 | Min | G01W 1/12 |
| 2019/0155234 | A1* | 5/2019 | Devi | H02J 3/381 |
| 2020/0051182 | A1* | 2/2020 | Fox | H02J 3/004 |
| 2020/0099226 | A1 | 3/2020 | Monforte et al. | |
| 2020/0099336 | A1* | 3/2020 | Monforte | H02S 50/00 |
| 2020/0209430 | A1 | 7/2020 | Shukla et al. | |
| 2020/0285691 | A1* | 9/2020 | Hoff | G06F 17/18 |
| 2021/0063975 | A1* | 3/2021 | Morley | G05B 23/0254 |

OTHER PUBLICATIONS

Vaz Ag R, et al., "An artificial neural network to assess the impact of neighbouring photovoltaic systems in power forecasting in Utrecht, the Netherlands", Renewable Energy, vol. 85, Jul. 17, 2015 (Jul. 17, 2015), pp. 631-641, XP029291191,ISSN: 0960-1481, DOI:10.1016/J.RENENE.2015.06.0611. 1. Introduction 4. Methodology, 5. Results, 6. Conclusion.

* cited by examiner

PREDICTING POWER GENERATION OF A RENEWABLE ENERGY INSTALLATION

FIELD OF THE INVENTION

The invention relates to determining predicted power generation of a renewable energy installation, such as a solar energy installation, a wind turbine generator, or a wave energy installation. In particular, the invention uses past and present levels of power generation of further renewable energy installations in the neighbourhood to predict power generation of the renewable energy installation.

BACKGROUND

Harvesting energy from renewable sources continues to play an increasing role in meeting overall energy needs. For instance, light and heat from the sun can be harnessed as solar energy by a variety of techniques such as photovoltaics and solar heating, typically via the use of solar panels directed towards the sky to capture energy. Wind turbines can be used to capture energy from wind in order to generate electrical power. Also, energy from waves generated by wind passing over the surface of the sea, and/or by tides, can be harnessed for electricity generation.

A key challenge associated with renewable energy sources is that they are inherently intermittent. That is, energy from these sources cannot be dispatched on demand, which leads to associated uncertainty on the supply side. A main cause of the intermittent nature of such renewable energy sources is as a result of changeable weather patterns. Being able to predict weather patterns in the vicinity of renewable energy systems or installations is important so that appliances or devices that are powered by electrical power generated from energy captured by the renewable energy systems can be scheduled appropriately, or electrical power can be sourced from alternative sources.

Renewable energy systems are subject to both long- and short-term changes in the prevailing weather. For instance, a weather forecast over a relatively long horizon of several hours may indicate sunny conditions such that the sun irradiates a solar panel for capturing solar energy. However, even a single passing cloud could affect the amount of solar energy that can be captured by the panel over a shorter time horizon, e.g. less than half an hour. This can therefore affect the amount of energy available to electrical systems over this shorter time period.

Various methods for predicting weather patterns in order to appropriately schedule and plan power supply are known. One such method utilises numerical weather simulations obtained from meteorological organisations, which can be useful for predictions over longer timescales of several hours, for instance, but which is less useful for predicting shorter-term weather variations. Another such method utilises satellite imagery to track different features of incoming weather; however, again the relatively infrequent updates in satellite observations in this context mean that this method is less useful for shorter-term weather predictions. One method that performs better over shorter timescales is the use of sensors on-site at a renewable energy system to track and monitor changing weather conditions. However, such solutions suffer from being expensive as they require installation and maintenance of dedicated hardware, as well as significant computational requirements.

It is against this background to which the present invention is set.

SUMMARY OF THE INVENTION

According to an aspect of the invention there is provided a computer-implemented method for determining predicted power generation of a renewable energy installation. The method comprises receiving current power generation data indicative of a current power generation value for each of one or more neighbouring renewable energy installations. The method comprises determining, based on the received current power generation data, a current data map indicative of current power generation values across an area including the renewable energy installation and the one or more neighbouring renewable energy installations. The method comprises retrieving a previous data map indicative of power generation values across the area at a previous time, and determining, based on the previous and current data maps, a future data map indicative of power generation values across the area at a future time. The method comprises determining a predicted power generation value of the renewable energy installation at the future time based on the determined future data map.

For each of the neighbouring renewable energy installations, the method may comprise: retrieving historical power generation data indicative of one or more historical power generation values for the neighbouring renewable energy installation; and, normalising the received current power generation data against the retrieved historical power generation data. The current data map may be determined based on the normalised current power generation data.

In some examples, normalising the received current power generation data may comprise dividing the current power generation value by a value representative of the one or more historical power generation values for the neighbouring renewable energy installation. Optionally, the representative value is a mean value of the one or more historical power generation values.

The retrieved historical power generation data may comprise power generation values for the neighbouring renewable energy installation at a same time on one or more previous days as a current time.

The future data map may comprise normalised power generation values. In some examples, determining the predicted power generation value may comprise retrieving historical power generation data indicative of one or more historical power generation values for the renewable energy installation, obtaining the normalised predicted power generation value of the renewable energy installation at the future time from the determined future data map, determining the predicted power generation value from the normalised predicted power generation value against the retrieved historical power generation data for the renewable energy installation.

In some examples, determining the predicted power generation value may comprise multiplying the normalised predicted power generation value by a value representative of the one or more historical power generation values for the renewable energy installation.

Optionally, the representative value is a mean value of the one or more historical power generation values.

In some examples, determining the current data map may comprise interpolating the data indicative of current power generation values across the area. Optionally, the interpolation is performed across a grid covering the area.

The current data map may be a heat map obtained from the interpolated data indicative of current power generation values.

In some examples, determining the future data map comprises determining a motion vector field of the area based on the previous and current data maps, and translating the current data map along the determined motion vector field to the future time.

In some examples, determining the motion vector field may comprise application of one of: a Lucas-Kanade algorithm; Farneback's Polynomial Expansion method; the Anisotropic Diffusion method; and, the Horn-Schunk method.

In some examples, each of the neighbouring renewable energy installations may be within a prescribed distance from the renewable energy installation.

The method may comprise, prior to determining the current data map: for each of the neighbouring renewable energy installations, forming a virtual line between the neighbouring renewable energy installation and the renewable energy installation; and, determining the current data map if each of the angles between adjacent virtual lines is below a prescribed threshold angle. Optionally, the prescribed threshold angle may be 120 degrees, or any other suitable angle.

The method may comprise, prior to determining the current data map: fitting a virtual polygon between the neighbouring renewable energy installations, each neighbouring renewable energy installation being a vertex of the virtual polygon, and each pair of adjacent neighbouring renewable energy installations being connected by an edge of the virtual polygon; identifying the edge closest to the renewable energy installation; and, determining the current data map if a distance between the renewable energy installation and a closest point of the identified edge to the renewable energy installation is greater than a prescribed distance.

The method may comprise receiving a direction of travel of weather conditions in the vicinity of the renewable energy installation. Optionally, the direction of travel of weather conditions may be a wind direction in the vicinity of the renewable energy installation, or a direction of cloud movement for instance. The method may comprise determining the current data map if the direction of travel is different from a direction from the closest point of the identified edge to the renewable energy installation. Optionally, the difference may be quantified by an angle between the two direction. For instance, the method may comprise determining the current data map if an angle between the respective directions is greater than a prescribed threshold angle.

In some examples, a difference between the previous time and a current time is equal to a difference between the current time and the future time.

The method may comprise outputting a signal indicative of the predicted power generation value. The method may comprise transmitting a control signal to control operation of one or more appliances powered by the renewable energy installation based on the predicted power generation value.

The renewable energy installation and the neighbouring renewable energy installations may be one of: solar energy installations; wind energy installations; and, wave energy installations.

According to another aspect of the invention there is provided a non-transitory, computer-readable storage medium storing instructions thereon that when executed by a processor cause the processor to perform a method as described above.

According to another aspect of the invention there is provided a system comprising one or more computer processors for determining predicted power generation of a renewable energy installation. The system is configured to receive current power generation data indicative of a current power generation value for each of one or more neighbouring renewable energy installations. The system is configured to determine, based on the received current power generation data, a current data map indicative of current power generation values across an area including the renewable energy installation and the one or more neighbouring renewable energy installations. The system is configured to retrieve a previous data map indicative of power generation values across the area at a previous time, and determining, based on the previous and current data maps, a future data map indicative of power generation values across the area at a future time. The system is configured to determine a predicted power generation value of the renewable energy installation at the future time based on the determined future data map.

The system may comprise a controller configured to transmit a control signal to control operation of one or more appliances powered by the renewable energy installation based on the predicted power generation value.

According to another aspect of the invention there is provided a renewable energy installation comprising a system as described above.

BRIEF DESCRIPTION OF THE DRAWINGS

Examples of the invention will now be described with reference to the accompanying drawings, in which.

DETAILED DESCRIPTION

Figure 1:
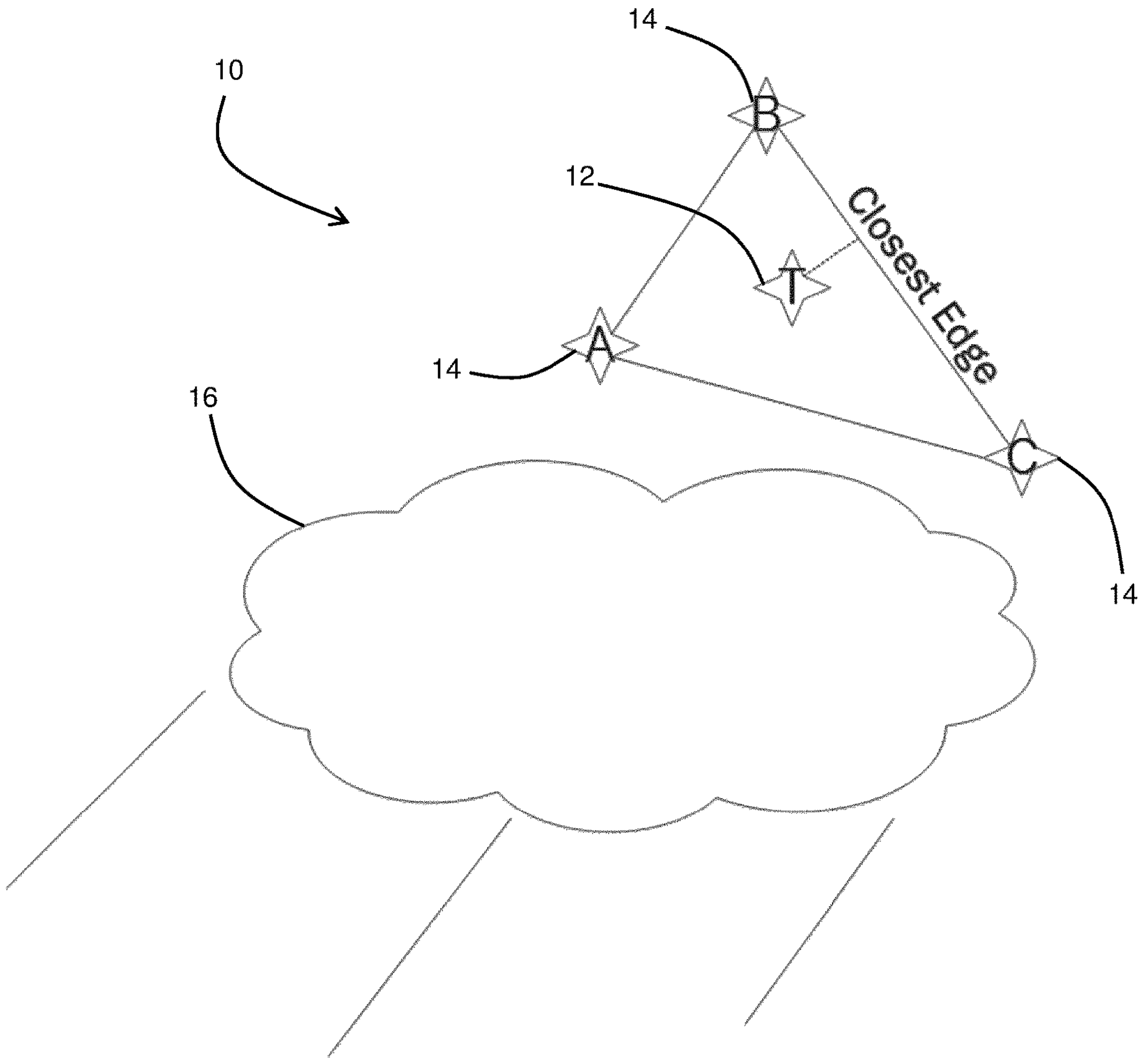
FIG. 1 illustrates a schematic plan view of a plurality of renewable energy installations arranged across a geographical area.

Intermittent renewable energy sources have a strong dependence on weather. Changes in weather affect the amount of energy that can be harvested by these sources, which in turn can affect power quality levels and result in curtailment of energy for electrical systems powered by such renewable sources.

By predicting incoming weather to a renewable energy installation or system, the expected upcoming power generating capabilities of the installation can be determined, and appropriate planning can be performed to deal with periods in which lower levels of power generation is expected. For instance, if it is predicted that there is an upcoming gap in power generation because of the weather then a battery system powered by the renewable installation may be scheduled to ensure it is fully charged ahead of the upcoming gap. In such systems—for instance, an electric vehicle battery—weather predictions can inform whether the battery should be charged overnight. In particular, in the case of a solar-powered system, the battery may be charged overnight if the following day is predicted to be cloudy and there is a cheaper tariff for charging at night.

The following describes examples of predicting the weather in the vicinity of solar energy systems or installations; however, it will be appreciated that the methods described herein are also applicable to other types of renewable energy system, such as wind, wave and tidal energy systems.

Forecasting methods typically range from longer-term forecasts—e.g. a few days or weeks—to shorter-term forecasts—e.g. a few hours or less. Generally, the shorter the time horizon over which a prediction is made, the more accurate it is, as there is less scope for uncertainty in the prediction. In the case of solar energy, however, the accuracy of shorter-term forecasts decreases on days with increased cloud cover. This is because, on days without clear sky, relatively small cloud movements can have a relatively significant effect on the generating capability of solar panels. This creates variability that is difficult to forecast, which can lead to potential power imbalances.

In the case of a solar photovoltaic (PV) system, forecasting the power output typically includes two steps. Firstly, the solar irradiance—i.e. the solar radiation power per unit area of a solar panel—is predicted and, secondly, the irradiance value is converted to a PV power output by using a function describing the PV installation. This function may typically be based on panel efficiency, panel angle, etc.

One method for determining solar irradiance is by post-processing numerical weather simulations obtained from meteorological organisations, e.g. the US National Oceanic and Atmospheric Administration. This is perhaps the most accurate method for longer-term calculations, e.g. greater than four hours or similar. However, the simulations do not directly predict cloud cover; rather, they only provide a probability of cloud cover. Such a method can therefore be useful for determining energy generation over a longer period of time, but is less accurate for providing shorter-term calculations or predictions of instantaneous power values.

Another method for determining solar irradiance is by tracking the motion of clouds using satellite imagery. Computer vision techniques may then be used to extrapolate cloud positions and predict ground irradiance. Such a method is more accurate over shorter timescales—e.g. less than four hours or similar—than using numerical weather simulations as clouds are observed directly by satellite imagery. Nonetheless, satellite observations are not updated continuously, with updates typically being around fifteen minutes apart. This means that for predictions over a time period of around half an hour or less, satellite imagery methods are less accurate. Furthermore, irradiance on the ground is not directly measured using such a method, which also contributes to less accurate calculations.

A further method for determining solar irradiance involves the use of a camera with a wide-angled lens located on-site in the vicinity of the solar panel installation. In particular, the camera is directed towards the sky and used to track the motion of the clouds in the immediate vicinity. Computer vision techniques can then be used to extrapolate the cloud positions, from which the irradiance forecasts can be determined. Such a method may be the most accurate over relative short time periods, such as half an hour or less, as its ground observations are updated frequently or even continuously. However, this is a particularly expensive method to implement as it requires the installation and maintenance of dedicated hardware, as well as having significant computational requirements. As such, this method may be feasible only for relatively large solar farms. There may also be concerns around privacy if the installation is close to a residential area, for instance.

The present invention is advantageous in that it provides accurate weather forecasts—particularly over relatively short time periods such as an hour, half an hour, quarter of an hour, etc.—without the need for expensive sensor equipment such as wide-angled lens cameras. Indeed, the invention benefits from not requiring any additional hardware. In particular, the power generating capacity of a renewable energy installation or system over a certain time period may be determined using data obtained from one or more surrounding or neighbouring renewable energy installations. The invention may therefore be particularly suitable in areas where there is a relatively high density of renewable energy installations, e.g. in a city in the case of solar PV panels. Specifically, the invention only requires instantaneous power generation values of the surrounding installations in order to perform the predictions.

FIG. 1 shows a schematic illustration of a plan view of a geographical area 10 including a plurality of renewable energy installations. In the described example, the installations are PV solar panel installations; however, it will be understood that the installations could be a different kind of solar energy installations. The area 10 includes a target renewable energy installation or system 12 and a plurality of neighbouring renewable energy installations 14 surrounding the target installation 12.

It is desired to determine the expected future power output of the target installation 12 over a certain time period. This future power output will depend on the amount of solar radiation that can be captured by the target installation 12, which in turn is dependent on the prevailing weather conditions in the vicinity of the target installation 12 over the time period.

FIG. 1 illustrates a cloud 16 in the vicinity of the area 10 including the solar installations 12, 14. In particular, it is illustrated that the cloud 16 is moving in a direction towards being overhead the target installation 12. Indeed, it may be seen that the cloud 16 will pass over some of the neighbouring installations 14 prior to reaching the target installation 12.

The reduction in power generation at these neighbouring installations 14 as a result of the cloud cover will therefore be apparent and measured prior to the cloud 16 reaching the target installation 12. This information, along with the positions of the neighbouring installations 14 relative to the target installation 12, can then be used to predict the power generation reduction that will be experienced by the target installation 12 when the cloud 16 passes over. More generally, power output values from the neighbouring installations 14 can be used to predict subsequent power output values of the target installation 12 in a manner that accounts for relatively short-term weather variations.

Figure 2:
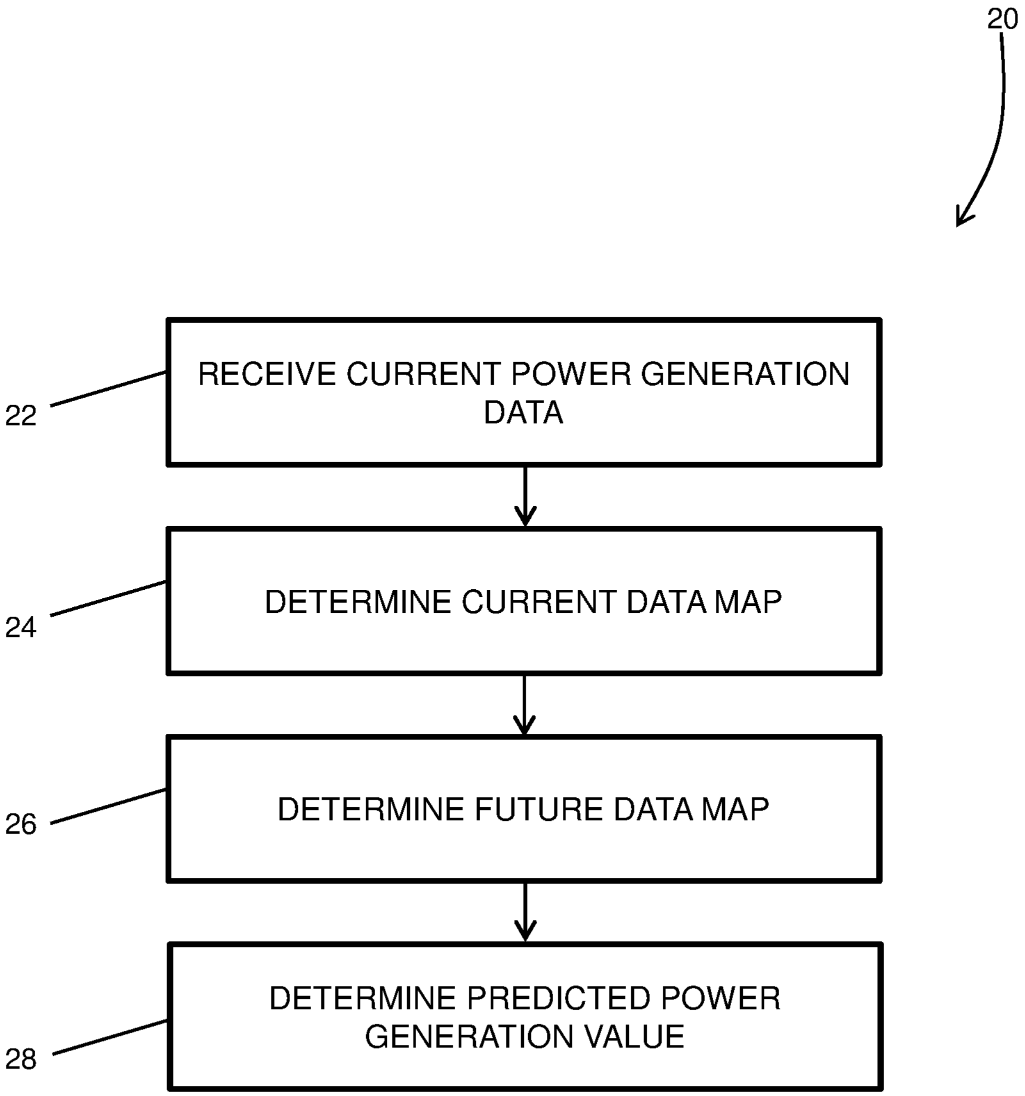
FIG. 2 shows the steps of a method to predict power generation of one of the renewable energy installations in FIG. 1; and, FIG. 3 illustrates a different example from FIG. 1 of a schematic plan view of a plurality of renewable energy installations arranged across a geographical area.

FIG. 2 shows the steps of a method 20 for determining predicted power generation of a renewable energy installation, e.g. the target solar installation 12. A step 22 of a method in accordance with the invention includes receiving current power generation data indicative of a current power generation value for each of the one or more neighbouring renewable energy installations 14. This may involve obtaining live power output or generation values from each of the neighbouring installations 14. These obtained power output values at a particular time—e.g. the current time t—are timestamped accordingly, and may be stored in a database or data store for later processing. The live or current power output values may be obtained using sensors located at the neighbouring installations 14, for instance. In particular, the method can employ existing PV panels as an array of photosensitive detectors, in effect becoming a (low-resolution) distributed camera.

Before or after the current power generation data is received, a step may be performed to check whether sufficient data is available from surrounding installations 14 in order to determine power generation of the target installation 12 with sufficient accuracy. In the described example, the target installation 12 needs to be sufficiently surrounded by neighbouring installations 14 for the power generation prediction to be performed.

One part of this may be a determination as to the distance from the target installation 12 to each of the neighbouring installations 14. For instance, a prescribed threshold distance may be set, and data from only those neighbouring installations 14 that are within this threshold distance is included and used to predict the target installation power output.

Installations further from the target installation 12 than the threshold distance may be deemed to be experiencing weather that is too distant to have a significant effect on the power generating capabilities of the target installation 12 over the time period of interest, e.g. 15 minutes, 30 minutes, etc. In the present context of solar energy, this threshold distance may be several kilometres, such as tens of kilometres, for instance 30 kilometres. It will be understood that any suitable threshold distance may be prescribed.

Another part of whether sufficient data is available from surrounding installations 14 may be to check that neighbouring installations 14 are sufficiently distributed or spread around the target installation 12 so that weather variation can be accounted for irrespective of the direction of travel of the prevailing weather conditions. In the example illustrated in FIG. 1, three neighbouring installations 14 are shown. In this case, each of the neighbouring installations 14 are within the prescribed threshold distance, if applicable, from the target installation 12.

In the described example, the check to determine whether the neighbouring installations 14 are sufficiently distributed around the target installation 12 involves forming a (virtual) polygon around the target installation 12. Specifically, the polygon is formed such that the neighbouring installations 14 are the vertices of the polygon, and the straight lines formed between each respective pair of adjacent neighbouring installations 14 are the edges of the polygon. In this case, with three neighbouring installations 14, the polygon is a triangle.

The edge of the polygon that passes closest to the target installation 12 may then be identified, and the minimum distance between the edge and the target installation 12 may be calculated. If this minimum distance is less than a prescribed threshold minimum distance then it may be deemed that the target installation 12 is not sufficiently surrounded by the neighbouring installations 14 to obtain an accurate prediction. On the other hand, in such a case the prediction may still be determined but with an acknowledgement that it may be less accurate, at least for certain directions of travel of the clouds.

In an example, one or more neighbouring installations may be omitted from use in the power generation prediction if they are deemed to be too close to the target installation 12. For instance, such neighbouring installations may be omitted if they are less than a prescribed distance from the target installation 12. Alternatively, if a polygon formed as described above has an edge that is too close to the target installation 12—e.g. its closest point is less than the prescribed threshold minimum distance away—at least one of the neighbouring installations forming a vertex of the relevant edge may be omitted and the polygon may be recalculated with the remaining neighbouring installations, optionally with the addition of one or more further neighbouring installations. In this way, the polygon may be the largest polygon enclosing the target installation 12 that can be formed by neighbouring installations 14 that are within a maximum prescribed radius from the target installation 12.

It is apparent that for this particular example, at least three neighbouring installations 14 are needed; however, it will also be apparent that any number of neighbouring installations greater than three may also be used. Indeed, a greater number of neighbouring installations may lead to more accurate predictions.

In the example illustrated in FIG. 1, the target installation 12 has three neighbouring installations 14 that form the polygon/triangle ABC. The neighbouring installation 14 at vertex A is 10 km from the target installation 12, the neighbouring installation 14 at vertex B is 8 km away, and the neighbouring installation 14 at vertex C is 25 km away. In this example, the prescribed maximum threshold distance is 30 km, and so each of the three neighbouring installations 14 are deemed to be sufficiently close to be included in the determination of power output for the target installation 12. In this case, the closest edge of the polygon ABC to the target installation 12 is the edge BC, which is 4 km away at its closest point. In the described example, that is deemed to be sufficiently far from the target installation 12 to allow for in-time computation of propagation of clouds. In the example illustrated in FIG. 1, in the worst-case scenario (in terms of prediction accuracy) clouds are coming from roughly northeast of the target installation 12, as this is the 'least covered' direction by neighbouring installations 14 as viewed from the target installation 12.

In some examples, when it is deemed that the target installation 12 is not sufficiently surrounded by neighbouring installations 14, the power output prediction may still be determined if a further condition is met. For instance, if the direction of travel of the prevailing weather conditions—e.g. in this case, direction of cloud movement—is from a direction in which the target installation 12 is sufficiently surrounded by neighbouring installations 14, then it may be determined that an accurate prediction may still be obtained.

As one option, this may be determined based on which edge(s) of the virtual polygon the cloud 16 passes over before reaching the target installation 12. If the relevant edge is sufficiently distant from the target installation 12 then an accurate prediction may still be obtained. As another option, the determination may be made with reference to a difference between the direction of travel of the cloud 16 and a direction from the closest point of the identified edge to the target installation 12. For instance, if an angle between the respective directions is greater than a prescribed threshold angle then the power generation prediction may be performed. As a further option, the determination may be made with reference to a difference between the direction of travel of the cloud 16 and a direction from a relevant one of the neighbouring installations 14 to the target installation 12.

In the example illustrated in FIG. 1, the cloud front 16 is coming from roughly southwest of the target installation 12. As the cloud 16 will first encounter the neighbouring installation 14 at point C of the polygon, there will be an associated recording of power degradation at this site/installation. Another degradation sample will be taken within minutes at the neighbouring installation 14 at point A of the polygon, and thus the pattern of cloud movement—together with its thickness—can be inferred using the method described below to estimate when and how the cloud 16 will cover the target installation 12. For instance, if the cloud 16 is moving at a speed of 40 km/h, it will reach the target installation 12 around 15 minutes after initial detection, as the target installation 12 is 10 km away from the edge AC of the polygon.

Returning to FIG. 2, once the current power generation data has been obtained from the relevant neighbouring installations 14, a next step 24 in accordance with the invention involves determining a current data map indicative of current power generation values across the area 10, i.e. an area that includes the target installation 12 and the neighbouring installations 14. In particular, the current data map is determined based on the received current power generation data. The current data map provides an indication of current power generation values across different parts of the geographical area 10, calculated using the received neighbouring installation data.

Preferably, the received current power generation data is normalised prior to determining the current data map. Advantageously, this allows for direct and meaningful comparisons to be made between different neighbouring installations 14, in particular so that the various received values can be used in an interpolation or similar to determine the current data map. This is because the different neighbouring installations 14 will likely be of different specification and have different levels of solar panel efficiency.

One option would be to adjust the current power generation data received from each neighbouring installation 14 to take into account the different energy harvesting capabilities of the respective neighbouring installation 14, with the adjusted values being used to determine the current data map.

A preferable option is to instead normalise the received current power generation using historical data from the respective neighbouring installations. Beneficially, this approach does not require knowledge of the various specification details that affect power output for each of the neighbouring installations 14, e.g. panel efficiency, panel angle, etc. That is, the described method—unlike some known methods—does not need to perform a conversion from power output (kW) to irradiance. As such a conversion—which may be performed using a trained neural network, for instance—increases the sources of error in the prediction, the described invention provides for a more accurate prediction to be obtained.

The historical data for a particular neighbouring installation 14 may be any suitable data that is representative of the power generation capabilities of the neighbouring installation. For instance, the historical data for a particular neighbouring installation 14 may include the power output data for each of a certain number of previous days at the corresponding time to the current or live time, i.e. the timestamped time t. A representative value based on this historical data may be determined and used to normalise the current power output value of the particular neighbouring installation 14. As an example, a mean value of the historical power output values may be calculated, and then the current power output value may be divided by this mean value to obtain the normalised current power output value. The normalised value may also be referred to as the power index for the particular neighbouring installation 14. The historical data may be stored in memory such that it can be retrieved when needed.

The normalised values of the current power output for each of the neighbouring installations 14 may then be used to determine the current data map indicative of current energy harvesting capabilities across different parts of the geographical area 10. In one example, the data map is a heat map. For instance, the geographical area 10 can be considered to be a cartesian plane, with the normalised power output value for each neighbouring installation 14 representing a point on the plane.

A regular grid may be defined across the area 10 with equal spacing between grid points. In one example, the grid points are spaced 10 metres apart in the two-dimensional grid; however, it will be understood that any suitable spacing may be used. The grid points closest to respective neighbouring installations 14 may be set to have a value equal to the normalised current output value of the respective neighbouring installation 14. This will result in some of the grid points having defined values and some not. An interpolation may therefore be performed using the grid points with defined values to define values for the remaining grid points across the area grid. In one example, a cubic interpolation may be performed between the values of existing normalised values (power indices). However, other suitable interpolation methods may be used, for instance linear interpolation, kriging, natural neighbour interpolation, or biharmonic spline interpolation.

Once the missing or undefined values of the grid are determined, the heat map may be determined based on the grid values. That is, the heat map represents the magnitude of a parameter indicative of the current or live energy harvesting opportunity across the geographical area 10. This (current) heat map may then be stored in a database ready to be used in subsequent processing.

Referring again to FIG. 2, a step 26 in accordance with the invention involves determining a future data map indicative of power generation values across the area 10 at a future time (i.e. a future timestep such as the next timestep t+1). In particular, this determination is made based on the current data map (determined as described above) and also on one or more previous data maps. For instance, the previous data map may correspond to the map indicative of power generation values across the area 10 at the previous timestep t−1 (from the current timestep t). In particular, the previous data map may have been calculated in a corresponding manner to the current data map, as described above, and stored in a database ready for use in subsequent processing. The previous data map (or each of the previous data maps) may therefore be retrieved from memory in order to determine the future data map. Typically, a difference between the previous time t−1 and the current time t is equal to a difference between the current time t and the future time t+1.

In order to determine the future data map from the retrieved current and previous data maps, a motion vector field of the area 10 may be determined based on the previous and current data maps. In an example in which the current and previous data maps are heat map images of the area 10, these heat map images may be input to an algorithm that can solve the optical flow equation to obtain motion vectors of each pixel/panel of the defined grid covering the area 10. In particular, the algorithm determines the motion vectors of each pixel of the image (of the indicative power values across the area 10) by taking two images taken from the same position but closely separated in time, i.e. the current and previous data maps.

In this case, the optical flow equation will be undefined, containing one equation for two unknowns. To address this, the algorithm may assume for each pixel of the grid that the neighbouring pixels undergo the same motion, thus creating a set of equations that over-define the system. This can then be solved using the least squares method, for instance, to obtain the approximate motion vector of the central pixel.

The motion vector field may be determined using any suitable algorithm, such as the Lucas-Kanade method, Farneback's Polynomial Expansion method, the Anisotropic Diffusion method, or the Horn-Schunk method. Although the above example is described using only two frames—i.e. data maps for times t−1 and t, it will be understood that a greater number of frames may be used.

The current data map may then be translated along the determined motion vector field to the future timestep t+1 to obtain the expected power index heat map at time t+1, i.e. the future data map. In this way, the interpolated heat map of the power index of the area/region 10 is produced, and optical flow methods are used to extrapolate its future position to allow a power forecast to be determined.

An alternative to using an optical flow method may be to use an algorithm that determines or predicts a next frame of video. For instance, this could be a machine learning or artificial intelligence algorithm that takes as input the known frames in the form of the current and previous data maps, and outputs the predicted frame in the form of the future data map at time t+1.

Referring again to FIG. 2, a next step 28 of a method in accordance with the invention involves determining a predicted power generation value of the target installation 12 at the future time t+1 based on the future data map obtained at step 26. In a case in which the future data map includes normalised power generation values, then this normalisation needs to be reversed to obtain the actual predicted power generation or output value.

In a corresponding manner to the normalisation process outlined above, the reversal process may utilise historical data associated with the target installation 12. In particular, this may involve retrieving, from memory, historical power generation data indicative of one or more historical power generation values for the target installation 12.

The historical data for the target installation 12 may be any suitable data that is representative of the power generation capabilities of the target installation 12. For instance, the historical data may include the power output data for each of a certain number of previous days at the corresponding time to the future or current time.

A representative value based on this historical data may be determined and used to reverse the normalisation of the future power output value of the target installation 12 obtained from the future data map. As an example, a mean value of the historical power output values may be calculated, and then the normalised future power output value obtained from the future data map (i.e. the value of the future data map at a point corresponding to the target installation 12) may be multiplied by this mean value to obtain the actual predicted or expected power output value. The method 20 can be repeated to then obtain the expected power output value for the next future timestep.

In the above, it is described that the current and previous data maps are determined using power generation data obtained from each of the neighbouring installations 14. Preferably, this determination also uses power generation data obtained from the target installation 12 itself.

Once the predicted power generation value for the target installation 12 has been obtained, this information can then be used to inform power scheduling of appliances, etc. For instance, a signal indicative of the predicted power generation value may be output so that appropriate control action may be taken. The method may optionally include transmitting a control signal to control operation of one or more appliances powered by the target installation 12 based on the predicted power generation value. For instance, automatic scheduling of battery charging may be performed to optimise charging efficiency, e.g. charging is not scheduled to occur when a gap in energy harvesting potential at the target installation 12—e.g. because of cloud cover—is predicted. As an example, the expected power output may be used to schedule appliances to take advantage of an expected surplus of solar energy in the case of a clear sky or clouds moving away, or temporarily putting some appliances on hold if there is not expected to be sufficient solar energy in the short term (e.g. next 15-20 minutes). Also, a short-term surplus or deficit of expected renewable energy may be leveraged in peer-to-peer local transactive energy systems, to better map producers and consumers of renewable energy in the short term, thus solving potential power imbalances.

The invention therefore provides additional support for solving (short-term) power imbalances through better energy dispatching planning in microgrids and smart grids, for instance, thus maintaining higher power quality levels and reducing curtailment of renewable energy.

Figure 3:
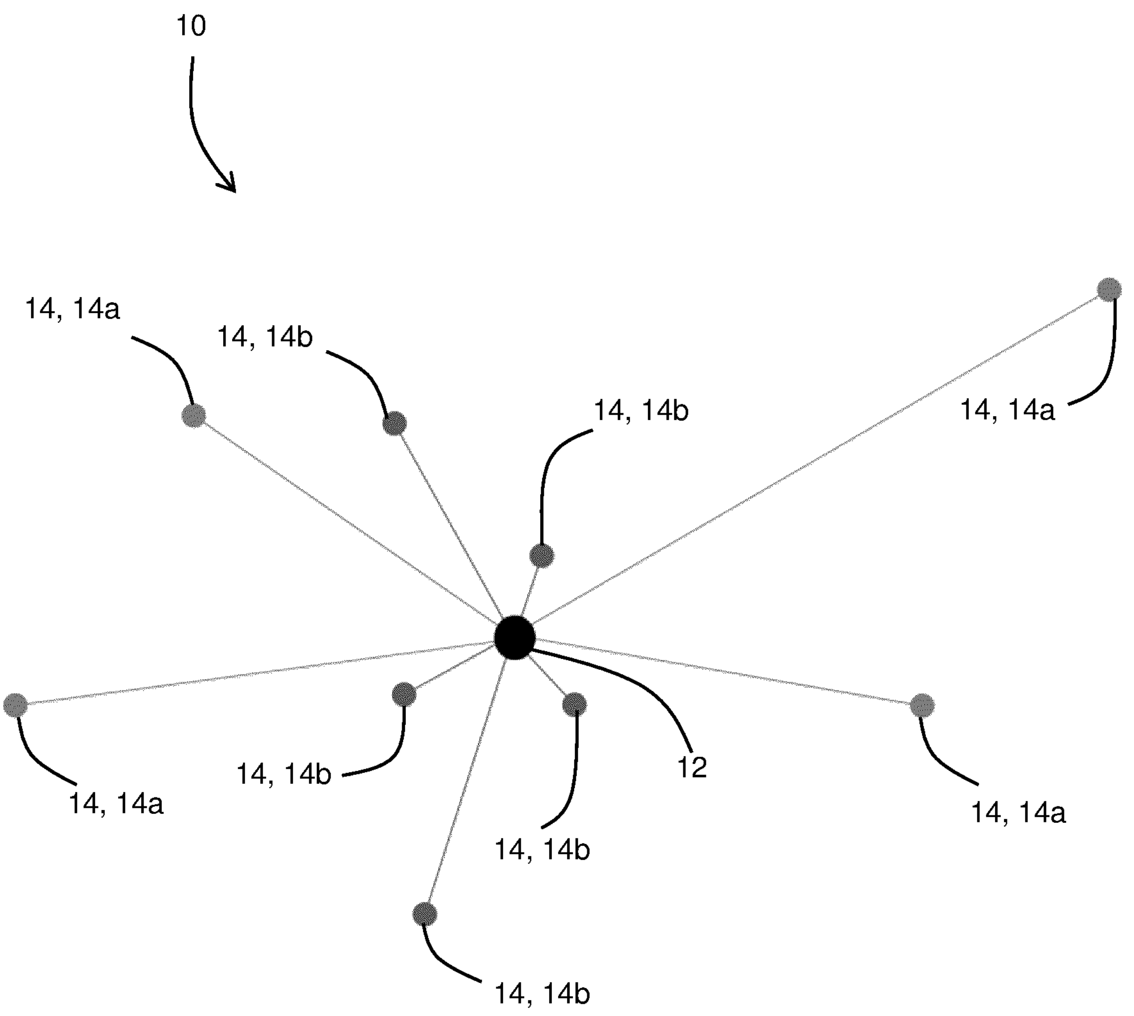

FIG. 3 schematically illustrates an alternative approach for determining whether the target installation 12 is sufficiently surrounded by neighbouring installations 14 so that a predication of required/desired accuracy may be obtained. In the illustrated example, it is seen that there are nine neighbouring installations 14 that may potentially be used for the prediction. However, some of these neighbouring installations 14—namely, the neighbouring installations 14*a*—are identified as being too distant from the target installation 12, i.e. they are greater than the prescribed maximum threshold distance away, e.g. 30 km.

As such, only the remaining neighbouring installations 14—namely, the neighbouring installations 14*b*—are to be used to determine whether the target installation 12 has a sufficient distribution of (nearby) neighbouring installations 14 to obtain an accurate prediction. To do this, (virtual) radial lines may be formed from the target installation 12 to each of the nearby neighbouring installations 14*b*. A calculation may then be performed to check whether any of the angles between these radial lines (to the nearby neighbouring installations 14*b* only) are greater than a prescribed threshold angle. Purely as an illustrative example, the threshold angle may be 120 degrees. Provided that each of the angles is less than the threshold angle, it may be determined that the target installation 12 has a sufficient distribution of neighbouring installations 14 to obtain an accurate prediction.

The described method may be implemented on any suitable computing device, for instance by one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the method, and the processor(s) may execute the stored instructions to perform the method.

The computing device implementing the method may be located on-site in the vicinity of the target renewable energy installation, or may be located remotely therefrom. The computing device may be part of network, e.g. a cloud network, that can communicate with neighbouring installations to receive power generation data. The processing performed to implement the method may be performed at a single location or in different locations as part of a distributed network, optionally wholly or partly in the cloud.

Many modifications may be made to the above-described examples without departing from the spirit and scope of the invention as defined herein with particular reference to the appended claims.

Although the above examples have been described in the context of solar energy, it will be understood that the invention is also applicable to different types of renewable energy. Provided that power generation data is available for surrounding installations harvesting the same type of renewable energy, then power generation predictions for a target installation can be determined that takes into account changing weather conditions—e.g. cloud cover, wind direction, wind speed, etc.—over the geographical area of interest.

In the above-described examples, a plurality of neighbouring installations—for instance, at least three neighbouring installations—are required in order to provide an accurate determination of expected power generation at the target installation. However, it will be understood that more generally one or more neighbouring installations may be sufficient to provide an accurate prediction. For instance, if a single neighbouring installation is positioned between the target installation and an incoming weather front, e.g. cloud cover, then this may still be sufficient to predict a degradation of power output at the target installation ahead of the cloud cover reaching the target installation.

The invention claimed is:

1. A computer-implemented method for determining predicted power generation of a renewable energy installation, the method comprising:

determining a set of neighbouring renewable energy installations that are distributed around the renewable energy installations, wherein the set of neighbouring renewable energy installations is chosen such that the neighbouring renewable energy installations fulfil one or more of the following criteria:

each of the neighbouring renewable energy installations is within a prescribed distance from the renewable energy installation, or each angle between adjacent virtual lines is below a prescribed threshold, each of the virtual lines respectively extending between each neighbouring renewable energy installation and the renewable energy installation, or a distance between the renewable energy installation and a closest point of an edge of a virtual polygon that is closest to the renewable energy installation is greater than a prescribed distance, the virtual polygon being fitted between the neighbouring renewable energy installations, with each of the neighbouring renewable energy installations being a vertex of the virtual polygon and each pair of adjacent neighbouring renewable energy installations being connected by a respective edge of the virtual polygon;

receiving current power generation data indicative of a current power generation value for each of the neighbouring renewable energy installations;

determining, based on the received current power generation data, a current data map indicative of current power generation values across an area including the renewable energy installation and the one or more neighbouring renewable energy installations;

retrieving a previous data map indicative of power generation values across the area at a previous time, and determining, based on the previous data map and the current data map, a future data map indicative of power generation values across the area at a future time;

determining a predicted power generation value of the renewable energy installation at the future time based on the determined future data map;

outputting a signal indicative of the predicted power generation value; and transmitting a control signal to control operation of one or more appliances powered by the renewable energy installation based on the predicted power generation value.

2. The computer-implemented method according to claim 1, the method comprising, for each of the neighbouring renewable energy installations:

retrieving historical power generation data indicative of one or more historical power generation values for the neighbouring renewable energy installation; and, normalising the received current power generation data against the retrieved historical power generation data, wherein the current data map is determined based on the normalised current power generation data.

3. The computer-implemented method according to claim 2, wherein normalising the received current power generation data comprises dividing the current power generation value by a value representative of the one or more historical power generation values for the neighbouring renewable energy installation, optionally a mean value of the one or more historical power generation values.

4. The computer-implemented method according to claim 2, wherein the retrieved historical power generation data comprises power generation values for the neighbouring renewable energy installation at a same time on one or more previous days as a current time.

5. The computer-implemented method according to claim 2, wherein the future data map comprises normalised predicted power generation values, and wherein determining the predicted power generation value comprises:

retrieving historical power generation data indicative of one or more historical power generation values for the renewable energy installation;

obtaining the normalised predicted power generation value of the renewable energy installation at the future time from the determined future data map; and, determining the predicted power generation value from the normalised predicted power generation value against the retrieved historical power generation data for the renewable energy installation.

6. The computer-implemented method according to claim 5, wherein determining the predicted power generation value comprises multiplying the normalised predicted power generation value by a value representative of the one or more historical power generation values for the renewable energy installation, optionally a mean value of the one or more historical power generation values.

7. The computer-implemented method according to claim 1, wherein determining the current data map comprises interpolating the data indicative of current power generation values across the area, optionally performing the interpolation across a grid covering the area.

8. The computer-implemented method according to claim 7, wherein the current data map is a heat map obtained from the interpolated data indicative of current power generation values.

9. The computer-implemented method according to claim 1, wherein determining the future data map comprises:

determining a motion vector field of the area based on the previous and current data maps; and, translating the current data map along the determined motion vector field to the future time.

10. The computer-implemented method according to claim 9, wherein determining the motion vector field comprises application of one of: a Lucas-Kanade algorithm; Farneback's Polynomial Expansion method; the Anisotropic Diffusion method; or the Horn-Schunk method.

11. The computer-implemented method according to claim 1, wherein each of the neighbouring renewable energy installations are within a prescribed distance from the renewable energy installation.

12. The computer-implemented method according to claim 1, wherein the criteria being fulfilled comprises that each angle between adjacent lines is below the prescribed threshold, and wherein the prescribed threshold is 120 degrees.

13. The computer-implemented method according to claim 1, the method comprising:

receiving a direction of travel of weather conditions, optionally a wind direction, in a vicinity of the renewable energy installation; and, determining the current data map if the direction of travel is different from a direction from the closest point of the identified edge to the renewable energy installation, optionally if an angle between the respective directions is greater than a prescribed threshold angle.

14. The computer-implemented method according to claim 1, wherein a difference between the previous time and a current time is equal to a difference between the current time and the future time.

15. A non-transitory, computer-readable storage medium storing instructions thereon that when executed by a processor cause the processor to perform a method according to claim 1.

16. The computer-implemented method according to claim 1, wherein transmitting the control signal to control operation of the one or more appliances comprises optimizing charging efficiency of a battery.

17. The computer-implemented method according to claim 1, wherein transmitting the control signal to control operation of the one or more appliances comprises turning off a subset of the one or more appliances based on determining that the predicted power generation value is less than a required energy value to operate the one or more appliances.

18. A system comprising one or more computer processors for determining predicted power generation of a renewable energy installation, the system comprising a controller configured to:

determine a set of neighbouring renewable energy installations that are distributed around the renewable energy installations, wherein the set of neighbouring renewable energy installations is chosen such that the neighbouring renewable energy installations fulfil one or more of the following criteria:

each of the neighbouring renewable energy installations is within a prescribed distance from the renewable energy installation, or each angle between adjacent virtual lines is below a prescribed threshold, each of the virtual lines respectively extending between each neighbouring renewable energy installation and the renewable energy installation, or a distance between the renewable energy installation and a closest point of an edge of a virtual polygon that is closest to the renewable energy installation is greater than a prescribed distance, the virtual polygon being fitted between the neighbouring renewable energy installations, with each of the neighbouring renewable energy installations being a vertex of the virtual polygon and each pair of adjacent neighbouring renewable energy installations being connected by a respective edge of the virtual polygon;

receive current power generation data indicative of a current power generation value for each of the neighbouring renewable energy installations;

determine, based on the received current power generation data, a current data map indicative of current power generation values across an area including the renewable energy installation and the one or more neighbouring renewable energy installations;

retrieve a previous data map indicative of power generation values across the area at a previous time, and determining, based on the previous and current data maps, a future data map indicative of power generation values across the area at a future time;

determine a predicted power generation value of the renewable energy installation at the future time based on the determined future data map;

output a signal indicative of the predicted power generation value; and transmit a control signal to control operation of one or more appliances powered by the renewable energy installation based on the predicted power generation value.

19. The renewable energy installation comprising a system according to claim 18.

* * * * *